(12) United States Patent
Lintz et al.

(10) Patent No.: US 11,604,863 B2
(45) Date of Patent: Mar. 14, 2023

(54) ALIGNMENT SYSTEM

(71) Applicant: GENTEX CORPORATION, Zeeland, MI (US)

(72) Inventors: Joshua D. Lintz, Allendale, MI (US); Adam R. Heintzelman, Grand Rapids, MI (US); Joseph A. DeGroot, Hamilton, MI (US)

(73) Assignee: GENTEX CORPORATION, Zeeland, MI (US)

( * ) Notice: Subject to any disclaimer, the term of this patent is extended or adjusted under 35 U.S.C. 154(b) by 337 days.

(21) Appl. No.: 17/038,996

(22) Filed: Sep. 30, 2020

(65) Prior Publication Data

US 2021/0097276 A1 Apr. 1, 2021

Related U.S. Application Data

(60) Provisional application No. 62/907,741, filed on Sep. 30, 2019.

(51) Int. Cl.
*G06K 9/20* (2006.01)
*G06F 21/32* (2013.01)
(Continued)

(52) U.S. Cl.
CPC ............ *G06F 21/32* (2013.01); *B60R 25/255* (2013.01); *G02B 3/00* (2013.01); *G06F 18/22* (2023.01);
(Continued)

(58) Field of Classification Search
CPC ...... G06V 40/19; G06V 40/18–40/197; G06V 40/60–40/67; A61B 3/152; A61B 3/14–3/158
See application file for complete search history.

(56) References Cited

U.S. PATENT DOCUMENTS 4,109,237 A * 8/1978 Hill ...................... A61B 5/1171
382/117
7,224,822 B2 * 5/2007 Heacock ................ G06V 40/19
382/117
(Continued)

FOREIGN PATENT DOCUMENTS

WO 2002007068 A1 1/2002
WO 2009067737 A1 6/2009

OTHER PUBLICATIONS

International Preliminary Report on Patentability dated Apr. 5, 2022, for corresponding PCT application No. PCT/US2020/053519, 7 pages.

(Continued)

*Primary Examiner* — Brian Werner
(74) *Attorney, Agent, or Firm* — Price Heneveld LLP; Brian James Brewer

(57) ABSTRACT

An alignment system may comprise a housing defining a channel having a first end and a second end; a light source disposed at the first end of the channel; and an alignment image disposed at the second end of the channel. The light source may be in optical communication with the alignment image. The alignment system may further comprise a baffle extending around at least a portion of an inner perimeter of the channel, the baffle defining a backlight aperture. The light source may be in selective optical communication with the alignment image.

17 Claims, 3 Drawing Sheets

(51) Int. Cl.
    *G02B 3/00*           (2006.01)
    *B60R 25/25*         (2013.01)
    *G06V 40/19*         (2022.01)
    *G06V 10/141*       (2022.01)
    *G06V 40/60*         (2022.01)
    *G06F 18/22*         (2023.01)

(52) U.S. Cl.
    CPC ............ *G06V 10/141* (2022.01); *G06V 40/19* (2022.01); *G06V 40/67* (2022.01); *G02B 2003/0093* (2013.01)

(56) References Cited

U.S. PATENT DOCUMENTS

| | | | |
|---|---|---|---|
| 2002/0005893 A1* | 1/2002 | Horiguchi | G06V 40/19 348/137 |
| 2004/0156016 A1* | 8/2004 | Kerr | A61B 3/1241 351/206 |
| 2016/0374550 A1 | 12/2016 | Stevens et al. | |
| 2017/0011263 A1* | 1/2017 | Andersen | G06F 21/32 |
| 2018/0260544 A1 | 9/2018 | Jammalamadaka et al. | |

OTHER PUBLICATIONS

International Search Report dated Jan. 14, 2021, for corresponding PCT application No. PCT/US2020/053519, 3 pages.
Written Opinion dated Jan. 14, 2021, for corresponding PCT application No. PCT/US2020/053519, 6 pages.

\* cited by examiner

ALIGNMENT SYSTEM

CROSS REFERENCE TO RELATED APPLICATIONS

This application claims the benefit of and priority to U.S. Provisional Patent Application No. 62/907,741, filed on Sep. 30, 2019, entitled Alignment System, the entire disclosure of which is hereby incorporated herein by reference.

FIELD OF THE DISCLOSURE

This disclosure relates generally to alignment systems, and in particular, to alignment systems for use with biometric identification, authentication or enrollment systems.

BACKGROUND

It is often challenging to align the desired body part of a user, such as an iris or a face, properly in the field of view of a camera or imager of an authentication system. A common alignment method is to use a live camera feed with a display, thereby allowing the user to see where they are relative to the camera or imager. However, this method may not always be feasible or appropriate.

SUMMARY

According to an aspect, an alignment system may comprise: a housing defining a channel having a first end and a second end; a light source disposed at the first end of the channel; and an alignment image disposed at the second end of the channel; wherein the light source may be in selective optical communication with the alignment image. The alignment system further may comprise a baffle extending around at least a portion of an inner perimeter of the channel, the baffle defining a backlight aperture. The backlight aperture may be a generally circular aperture. The light source may be disposed on a printed circuit board.

The alignment system may further comprise a diffuser disposed generally parallel to the alignment image and between the light source and the baffle. The alignment system may further comprise a lens in selective optical communication with the light source and disposed at the second end of the channel. The lens may be a plano-convex lens. The alignment system may further comprise a colored light filter disposed generally parallel to the alignment image and between the light source and the baffle. The alignment image may be disposed on a substrate. The alignment image may comprise an opaque portion and a transparent portion, and the opaque portion may extend at least around an outer perimeter portion of the substrate. The alignment system may be disposed in a vehicle. The alignment system may be in communication with at least one vehicle system.

According to another aspect, an authentication system may comprise: an imager; an alignment system comprising a housing defining a channel having a first end and a second end; a light source disposed at the first end of the channel; and an alignment image disposed on a substrate and at the second end of the channel. The light source may be in optical communication with the alignment image. The imager may be disposed in proximity to the alignment system. The imager may be configured to capture an image of an object disposed in proximity to the second end of the channel of the alignment system and in the field of view of the imager.

The authentication system further may comprise a lens disposed at the second end of the channel and generally parallel to the alignment image. The authentication system further may comprise a baffle extending around at least a portion of an inner perimeter of the channel, the baffle defining a backlight aperture. The backlight aperture may be a generally circular aperture. The light source may be disposed on a printed circuit board. The authentication system further may comprise a diffuser, the diffuser disposed generally parallel to the alignment image and between the light source and the baffle. The authentication system further may comprise a colored light filter, the colored light filter disposed generally parallel to the alignment image and between the light source and the baffle. The authentication system further may comprise an electro-optic element. The imager and the alignment system may be selectively concealed behind the electro-optic element. The alignment image may be disposed on a substrate. The alignment image may comprise an opaque portion and a transparent portion, and the opaque portion may extend at least around an outer perimeter portion of the substrate and/or the alignment image. The authentication system may be disposed in a vehicle and may be in communication with at least one vehicle system. The imager may have a first field of view; the alignment system may have a second field of view; and the second field of view may at least partially coincide with the first field of view.

According to yet another aspect, a method of using an authentication system to align a feature may comprise: activating a light source of an alignment system, the alignment system having a housing defining a channel having a first end and a second end, a baffle disposed within the channel, and an alignment image disposed at the second end of the channel; activating an imager; illuminating, with the light source, the alignment image; determining, with a processor of the authentication system, whether an object may be within a field of view of the imager; wherein the field of view of the imager may be the field of view in which, when a user's eye may be in the field of view of the imager, the alignment image appears illuminated to the user. The method further may comprise the step of causing an electro-optic element disposed so as to selectively conceal components of the authentication system to clear upon the receipt of an input from a sensor. The sensor may be a proximity sensor. The method further may comprise the step of capturing an image through the electro-optic element with the imager. The method further may comprise the steps of comparing, by the processor, the captured image with stored image data; and determining, by the processor based on the comparison of the captured image with the stored image data, whether the user has previously been authenticated.

DETAILED DESCRIPTION

Figure 1:
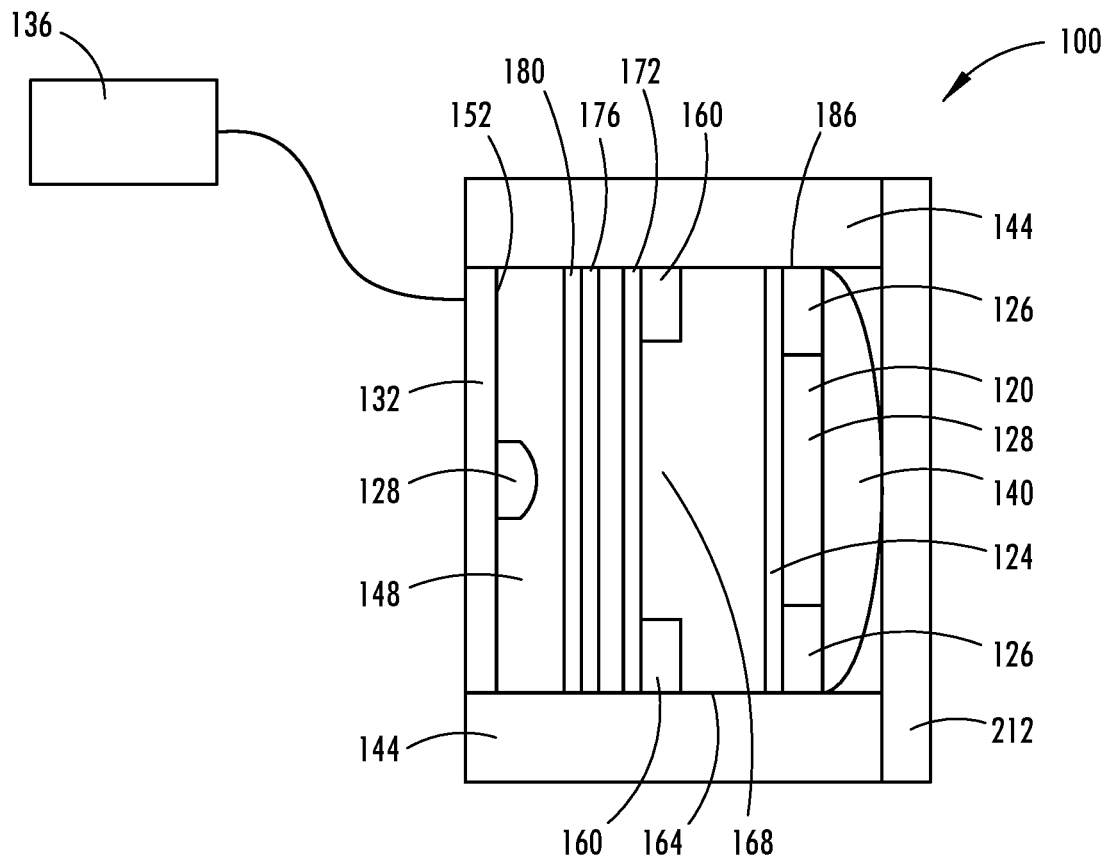
FIG. 1 illustrates a cross-sectional schematic diagram of a side view of an alignment device in accordance with this disclosure.
Figure 2:
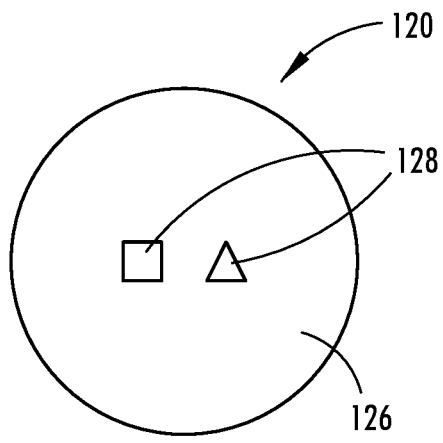
FIG. 2 illustrates an alignment image in accordance with this disclosure.

FIG. 1 illustrates an alignment system, shown generally at 100. The alignment system 100 may comprise an alignment image 120 disposed on a substrate 124, and a light source 130. Alignment image 120 may be etched into or printed onto substrate 124 or may comprise a film disposed on substrate 124. Alignment image may comprise an opaque portion 126 and a transparent portion 128 as illustrated in FIG. 2. Opaque portion 126 may extend at least around an outer perimeter of substrate 124. Transparent portion 128 may comprise an image, and may be disposed toward a central portion of substrate 124. In some embodiments, a controller 136 may be in electrical communication with light source 130 and may be configured to selectively activate or deactivate light source 130.

Alignment image 120 and light source 130 may be in a spaced apart relationship and in optical communication with one another. Light source 130 may be disposed on and in electrical communication with a printed circuit board (PCB) 132. PCB 132 may further comprise a heatsink. Light source 130 may comprise, for example, a light emitting diode (LED), a plurality of LEDs disposed in an array, an organic LED (OLED), or the like. As a result, embodiments of the present disclosure may allow the system to operate with low power demands since a single diode with low intensity may be used to activate alignment system 100.

In some embodiments, alignment system 100 may further comprise a housing 144. Housing 144 may define a channel 148 having a first end 152 and a second end 156. Channel 148 may have a cross-section having a circular shape, an elliptical shape, an oval shape, a polygonal shape, or any other suitable shape. Light source 130 may be disposed at first end 152 of channel 148.

In some embodiments, alignment system 100 may further comprise a lens 140. Lens 140 may comprise a plano-convex lens having a generally planar surface and an opposed convex surface. The generally planar surface of lens 140 may be substantially parallel with alignment image 120. Lens 140 may be between 1 and 30 mm in diameter. In some embodiments, lens 140 may be about 25 mm in diameter. In some embodiments, lens may be about 5 mm or less. In some embodiments, lens 140 may have an anti-reflective coating. Anti-reflective coating may be disposed on convex surface of lens 140. In use, lens 140 may be disposed at second end 156 of channel 148. In some embodiments, lens 140 may be disposed to be adjacent to alignment image 120, and alignment image 120 may appear to user to be its actual size. In some embodiments, lens 140 may be in a spaced-apart relationship with alignment image 120, and alignment image 120 may appear to user to be magnified from its actual size, thereby allowing the use of a smaller lens 140.

In some embodiments, a baffle 160 may extend generally orthogonally from an inner surface 164 of housing 144 and substantially parallel to alignment image 120. In some embodiments, a free-standing baffle 160 may be disposed substantially parallel to alignment image 120. Baffle 160 may extend around at least a portion of an inner surface of channel 148, thereby defining a backlight aperture 168. Baffle 160 may be in a spaced-apart relationship with lens 140. Alignment image 120 may be disposed between baffle 160 and lens 140. Lens 140 may be between 10 and 20 mm from baffle 160. In some embodiments, lens 140 may be about 15 mm from baffle 160. As a result, backlight aperture 168 may appear to be magnified by lens 140, thereby saving space and allowing alignment system 100 to take up less room than would otherwise be required.

The focal length of lens 140 may be chosen to prevent a user from being able to see baffle 160 when looking into alignment system 100. The focal length of lens 140 may range from about 50-100 mm. In some embodiments, lens 140 may have a focal length of about 75 mm.

Baffle 160 may be configured to direct light from light source 130 as it passes through backlight aperture 168. Baffle 160 may create a field of view 174 for alignment system 100 in which a user may perceive alignment image 120 to be illuminated when the user's eye is in the field of view 174 of alignment system 100.

Figure 3:
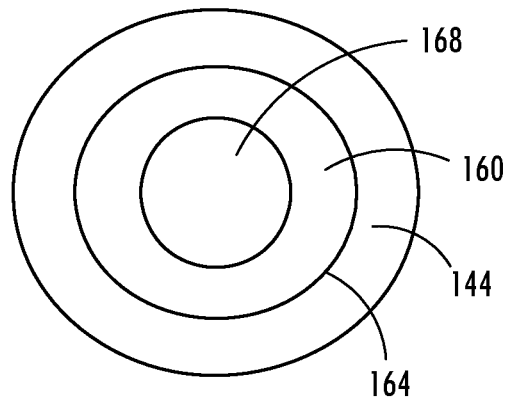
FIG. 3 illustrates a front view of the alignment device shown in FIG. 1.

In some embodiments, alignment system 100 may further comprise a transparent substrate 172 extending across at least a portion of a cross-sectional area of channel 148. Baffle 160 may be disposed on transparent substrate 172. In some embodiments, transparent substrate 172 may comprise a glass substrate. Baffle 160 may comprise a film or an opaque layer disposed on transparent substrate 172. Baffle 160 may extend around at least a portion of a perimeter portion of transparent substrate 172 adjoining inner surface 164 of housing 144. In some embodiments, baffle 160 may extend along the entire perimeter portion of transparent substrate 172 a uniform distance from inner surface 164 of housing 144 toward the center of channel 148 as shown in FIG. 3.

Backlight aperture 168 formed by baffle 160 may be circular, elliptical, oval, polygonal, or of any suitable shape. Backlight aperture 168 may have the same shape as a cross-sectional area of interior of channel 148 or may have a different shape. The field of view 174 of alignment system 100 may differ in size and configuration depending on the size and shape of backlight aperture 168. Circular backlight apertures 168 may comprise horizontal and vertical alignment angles; i.e., angles in which the user's eye is correctly aligned, that are the same size as one another, while non-circular backlight apertures may have horizontal alignment angles that differ in size from the vertical alignment angles. Field of view 175 of alignment system 100 may coincide with an area created by the alignment angles of baffle 160.

Transparent portion 128 of alignment image 120 may comprise an image of a logo, a figure, writing, a pattern, a combination of these, or any suitable graphic image. Alignment image 120 may appear illuminated to a user when alignment image 120, backlight aperture 168, and light source 130 are aligned with one another and the user's eye is within the alignment angles of alignment system 100. When the user's eye is correctly aligned, light from light source 130 may pass through backlight aperture 168 and alignment image 120, thereby making alignment image 120 appear to the user to be illuminated. If the user's eye is not correctly aligned, baffle 160 may prevent the user from perceiving light from light source 130 passing through backlight aperture 168 to alignment image 120, and the alignment image 120 may not appear to be illuminated or the user may not see alignment image 120 at all.

In some embodiments, light source 130 may comprise multiple colors or may comprise a plurality of different colored light sources. Different colors may be used to indicate different statuses of alignment system 100 or an authentication system 200. For example, a green light may be used when an authentication is in progress, a red light may be used when authentication has failed, and a blue light may be used when authentication is complete. In some embodiments, light source 130 may be intermittent or flashing under certain conditions and may be steady under other conditions. For example, light source 130 may blink or flash if a user is too far away to be in a field of view 175 of a camera or imager 204 of authentication system 200, and may become steady once the user is within the field of view 175 of imager 204. Field of view 175 of imager 204 may at least partially coincide with field of view 174 of alignment system 200. In some embodiments, field of view 175 of imager 204 may be completely within field of view 174 of alignment system 200. such that an object that is within field of view 174 of alignment system 100 may also be within the field of view 175 of imager 120. Thus, if a user's eye is in the field of view 174 of alignment system, imager 120 may be capable of capturing an image of the user's eye for authentication or other purposes.

Figure 4:
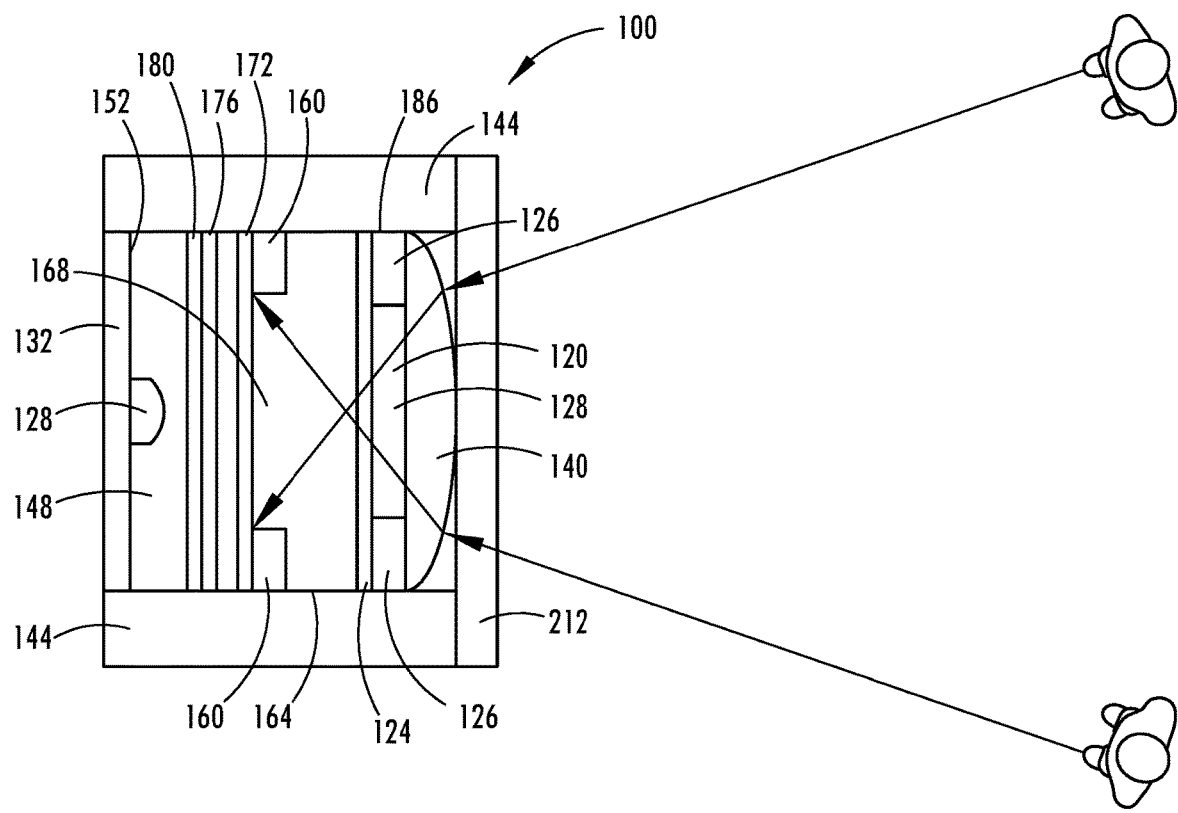
FIG. 4 illustrates a diagram of the field of view of the imager of the alignment device shown in FIG. 1.

The extent that baffle 160 extends from inner surface 164 of housing 144 may determine the size and shape of the alignment angles in which the user is properly aligned. Referring to FIG. 4, as a user moves to the edge of the field of view 174 of alignment system 100, baffle 160 may come between the user's eye and alignment image 120 or light source 130. This may interfere with the user's view of transparent portion 128 of alignment image 120, causing transparent portion 128 either to not appear illuminated or to not be observable to the user.

In some embodiments, alignment system 100 may comprise a diffuser 176. Diffuser 176 may be disposed between light source 130 and lens 140 and may be generally parallel to alignment image 120. Diffuser 176 may be configured to diffuse light from light source 130, thereby preventing light from appearing as a point source of light.

In some embodiments, alignment system 100 may further comprise a colored light filter 180. Colored light filter 180 may be disposed generally parallel with alignment image 120 and between baffle 160 and light source 130. Colored light filter 180 may alter the perceived color of alignment image 120 when viewed by a user looking into alignment system 100, thereby allowing alignment image 120 to appear in a chosen color. For example, alignment image 120 may appear transparent with no colored filter, but a red colored filter may cause alignment image 120 to appear red to a user.

Alignment system 100 may be configured to be concealed behind an electro-optic (EO) element 184 when not in use. EO element 184 may be configured to selectively conceal entire alignment system 100, including housing 144, lens 140, and alignment image 120 by darkening to prevent the passage of light through EO element 184. EO element 184 may be capable of darkening when alignment system 100 is not in use and clearing when it is desired to use alignment system 100.

In some embodiments, controller 208 may be configured to receive an input from a sensor (not shown) such as a proximity sensor. Upon receipt of an input that indicates that an object is within the field of view 175 and/or within a pre-determined distance of authentication system 200, alignment system 100 may be activated and EO element 184 may clear, allowing the passage of light through EO element 184. Thus, alignment system 100 may be concealed behind EO element 184 until a user is sufficiently close to be able utilize alignment system 100.

In some embodiments, alignment system 100 may be disposed in a vehicle (not shown) and may be in communication with at least one vehicle system. Alignment system 100 may be disposed in a pillar of the vehicle, in a rearview mirror assembly of the vehicle, in a console or center stack, in a dashboard, or in any other suitable location. EO element 184 may be configured to conceal alignment system 100 from users while providing an aesthetically pleasing appearance.

Figure 5:
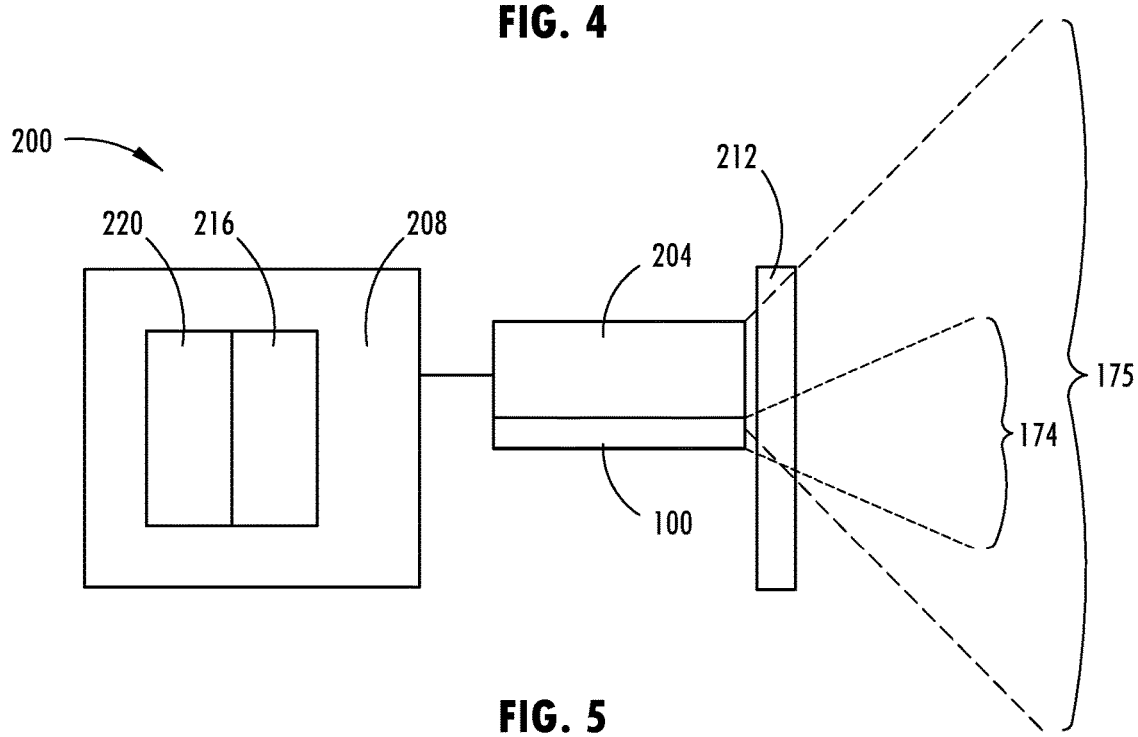
FIG. 5 illustrates an authentication system having an alignment system in accordance with claim 1.

In some embodiments, as shown in FIG. 5, alignment system 100 may be part of an authentication system 200 such as a biometric authentication system. Authentication system 200 may be capable of collecting biometric information, such as data on iris or facial features, from a user and comparing the captured biometric information with stored data to determine whether the user has previously been authenticated by authentication system 200.

Authentication system 200 may comprise a camera or other imager 204 configured to capture an image of a user's iris or face upon proper positioning of the user's eye or face in front of imager 204. Imager 204 may be disposed in proximity to alignment system 100 and may be capable of capturing an image of a desired subject when subject is aligned in the field of view of imager 204 in accordance with assistance from alignment system 100.

Alignment system 100 may assist a user in properly placing the user's iris or facial features in relation to imager 204 and to easily confirm the proper alignment, thereby facilitating the capture of the user's image and related biometric information. By assisting the user in positioning his or her iris or face in a desired location, the feature of the user to be imaged may be more closely aligned with the desired position. This may reduce the size of the required field of view 175 of imager 204. This, in turn, may allow a lower resolution imager 204 to be used in authentication system 200 which may result in manufacturing cost savings.

Authentication system 200 may further comprise a controller 208. Controller 208 may be configured to activate authentication system 200 upon the receipt of appropriate instructions or the occurrence of a particular event. In some embodiments, controller 208 may be in communication with alignment system 100 and may be configured to cause the activation of light source 130 of alignment system 100 upon the receipt of appropriate instructions or the occurrence of a particular event. Light source 130 may be activated before, after, or at the same time that imager 204 of authentication system 200 is activated. In some embodiments, light source 130 of alignment system 100 may be left on even when not in use. The output of light source 130 may be adjusted depending on the ambient light conditions.

Once light source 130 has been activated, a user may be able to use alignment system 100 to align his or her iris or face properly to allow authentication system 200 to authenticate the user. Controller may further be configured to activate imager 204 and to cause imager 204 to capture an image of a user's iris or face when the user's iris or face is in the field of view 175 of imager 204.

Authentication system 200 may further comprise a processor 216 in communication with a memory 220. Data associated with stored images of previously authenticated users may be stored in memory 220. Processor 216 may be configured to, upon receipt of data from a captured image, compare the data from the captured image with data associated with stored image(s) of previously authenticated users and to determine whether the captured image is a match for a stored image.

Authentication system 200, including both alignment system 100 and imager 204, may be disposed behind EO element 184. EO element 184 may be configured to selectively conceal both alignment system 100 and components of authentication system 200, such as imager 204, when not in use. EO element 184 may be configured to be in a darkened state when authentication system 200 is not in use and to clear when it is desired to use authentication system 200 and for the duration of the use. When authentication system 200 is no longer being used, EO element 184 may return to a darkened state. Upon a determination that authentication system 200 is to be activated, EO element 184 may be configured to clear, thereby allowing the user to use alignment system 100 to properly align his or her eye or face for authentication by authentication system 200. This may allow imager 204 to capture an image of the user's face or eye for processing and for comparing with data from stored images of previously authenticated individuals.

In some embodiments, authentication system 200 may be disposed in a vehicle (not shown). Authentication system 200 may be disposed in a pillar of the vehicle, in a rearview mirror assembly of the vehicle, in a dashboard or console of the vehicle, or in any other suitable location. For example, authentication system 200 may be disposed in a rearview mirror assembly (not shown). A portion of a mirror element (not shown) of mirror assembly may be selectively transparent or may be configured to allow the transmission of near-IR and/or visible light to allow the use of authentication system 200. In another example, authentication system 200 may be disposed in a pillar of the vehicle. EO element 184 may clear when a sensor, such as a proximity sensor, is activated by, for example, the approach of a user. Authentication system 200 may be configured to authenticate the user and, once authenticated, allow the user access to the vehicle.

Alignment system 100 may provide intuitive alignment for a user. If the user is able to see the illuminated alignment image 120, user is properly aligned, whereas if the user does not see the illuminated alignment image 120 at all or alignment image 120 does not appear illuminated, user may need to adjust position to be properly aligned.

Alignment system 100 may be configured to display a custom-designed alignment image 120 and alignment image may be illuminated in a variety of colors, thereby blending the alignment mechanism into a design scheme. In addition, alignment system 100 may use low power because a single diode with low intensity may be used to active the alignment mechanism.

Figure 6:
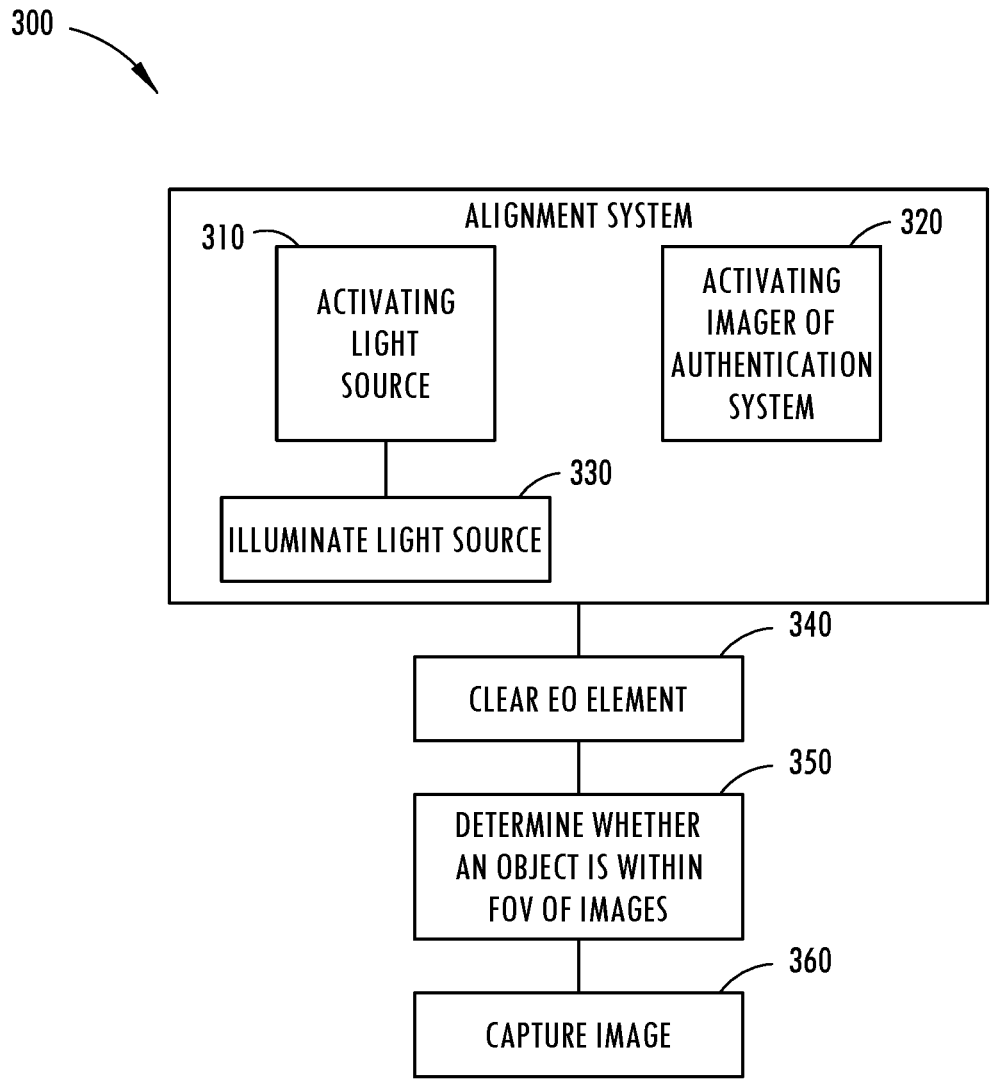
FIG. 6 is a flowchart of a method of using an authentication system having an alignment system in accordance with claim 1.

As shown in FIG. 6, a method of using an authentication system 200 having an alignment system 100, shown generally at 300, may comprise activating light source 130 of alignment system 100 in step 310 and activating imager 204 of authentication system 200 in step 320. Activating the light source 130 of alignment system 100 may cause the illumination of alignment image 120 in step 330. In some embodiments, alignment system 100 may be selectively concealed behind EO element 184, and EO element 184 may go from a darkened state to a clear state in step 340, thereby allowing a user to access alignment system 100 to properly align his or her eye or face for authentication by authentication system 200. Once alignment system 100 has been activated and alignment image 120 illuminated, the user may align his or her iris or face by looking at lens 140 of authentication system 200 to position iris or face in the desired field of view 174 of alignment system 100. Authentication system 200 may be configured to determine, using processor 216, whether an object is within the field of view 175 of imager 204 in step 350. Once a user's eye or face is properly aligned, imager 204 may capture an image of it in step 360. Processor 216 of authentication system 200 may compare captured image with stored image data to determine whether the user has previously been authenticated. Upon a determination that the user has been previously authenticated, authentication system 200 may communicate that information to a vehicle system.

In use, alignment image 120 may appear illuminated if a user's eye or face is properly positioned in relation to alignment system 100. If the user's eye or face is not properly positioned in relation to alignment system 100, alignment image 120 may be visible, but it may not appear to be illuminated or may not be visible at all. Baffle 160 may prevent light from light source 130 from traveling through alignment image 120 from the user's perspective unless the user's eye is properly positioned. As the user moves his or her eye or face into the proper position, baffle 160 may no longer prevent light from reaching the users eye and alignment image 120 may appear to be become illuminated.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

In this document, relational terms, such as first and second, top and bottom, front and back, left and right, vertical, horizontal, and the like, are used solely to distinguish one entity or action from another entity or action, without necessarily requiring or implying any actual such relationship, order, or number of such entities or actions. These terms are not meant to limit the element which they describe, as the various elements may be oriented differently in various applications. Furthermore, it is to be understood that the device may assume various orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise.

The invention claimed is:

1. An alignment system, comprising:
    a housing defining a channel, the channel having a first end and a second end;
    a light source disposed at the first end of the channel;
    an alignment image disposed at the second end of the channel;
    a baffle extending around at least a portion of an inner perimeter of the channel, the baffle defining a backlight aperture; and
    a colored light filter disposed in the channel and generally parallel to the alignment image and between the light source and the baffle;
    wherein the light source is in selective optical communication with the alignment image.

2. The alignment system of claim 1, further comprising a diffuser disposed in the channel and generally parallel to the alignment image and between the light source and the baffle.

3. The alignment system of claim 1, further comprising a lens disposed at the second end of the channel and in selective optical communication with the light source.

4. The alignment system of claim 1, wherein the alignment image is on a substrate;
    wherein the alignment image comprises an opaque portion and a transparent portion; and
    wherein the opaque portion extends at least around an outer perimeter portion of the substrate.

5. The alignment system of claim 1, wherein the alignment system is disposed in a vehicle; and
    wherein the alignment system is in communication with at least one vehicle system.

6. An authentication system comprising:
    an imager;
    an alignment system, comprising:
        a housing defining a channel having a first end and a second end;
        a light source disposed at the first end of the channel;
        an alignment image disposed at the second end of the channel;
        a baffle extending around at least a portion of an inner perimeter of the channel, the baffle defining a backlight aperture; and
        a colored light filter, the colored light filter disposed generally parallel to the alignment image and between the light source and the baffle;
        wherein the light source is in optical communication with the alignment image; and
    wherein the imager is disposed in proximity to the alignment system.

7. The authentication system of claim 6, wherein the imager is capable of capturing an image of an object disposed in proximity to the second end of the channel of the alignment system and in a field of view of the imager.

8. The authentication system of claim 6, further comprising a lens disposed at the second end of the channel and generally parallel to the alignment image.

9. The authentication system of claim 6, further comprising a baffle extending around at least a portion of an inner perimeter of the channel, the baffle defining a backlight aperture.

10. The authentication system of claim 6, further comprising a diffuser, the diffuser disposed generally parallel to the alignment image and between the light source and the baffle.

11. The authentication system of claim 6, further comprising an electro-optic element, wherein the imager and the alignment system are selectively concealed behind the electro-optic element.

12. The authentication system of claim 6, wherein the imager has a first field of view;
    wherein the alignment system has a second field of view; and
    wherein the second field of view at least partially coincides with the first field of view.

13. The authentication system of claim 6, wherein the alignment image comprises an opaque portion and a transparent portion; wherein the opaque portion extends at least around an outer perimeter portion of the alignment image.

14. The authentication system of claim 6, wherein the authentication system is disposed in a vehicle and is in communication with at least one vehicle system.

15. A method of using an authentication system to align a feature of a user, comprising:
    activating a light source of an alignment system, the alignment system having a housing defining a channel having a first end and a second end, a baffle disposed within the channel, and an alignment image disposed at the second end of the channel;
    activating an imager in proximity with the alignment system;
    illuminating, with the light source, the alignment image;
    determining, with a processor of the authentication system, whether an object is within a field of view of the imager; and
    causing an electro-optic element disposed so as to selectively conceal components of the authentication system to clear upon the receipt of an input from a sensor;
    wherein the field of view of the imager is the field of view in which, when a user's eye is in the field of view of the imager, the alignment image appears illuminated to the user.

16. The method of claim 15, further comprising the step of capturing an image with the imager through the electro-optic element.

17. The method of claim 16, further comprising the steps of:
    comparing, by the processor, the captured image with stored image data; and
    determining, by the processor based on the comparison of the captured image with the stored image data, whether the user has previously been authenticated.

* * * * *